UNITED STATES PATENT OFFICE.

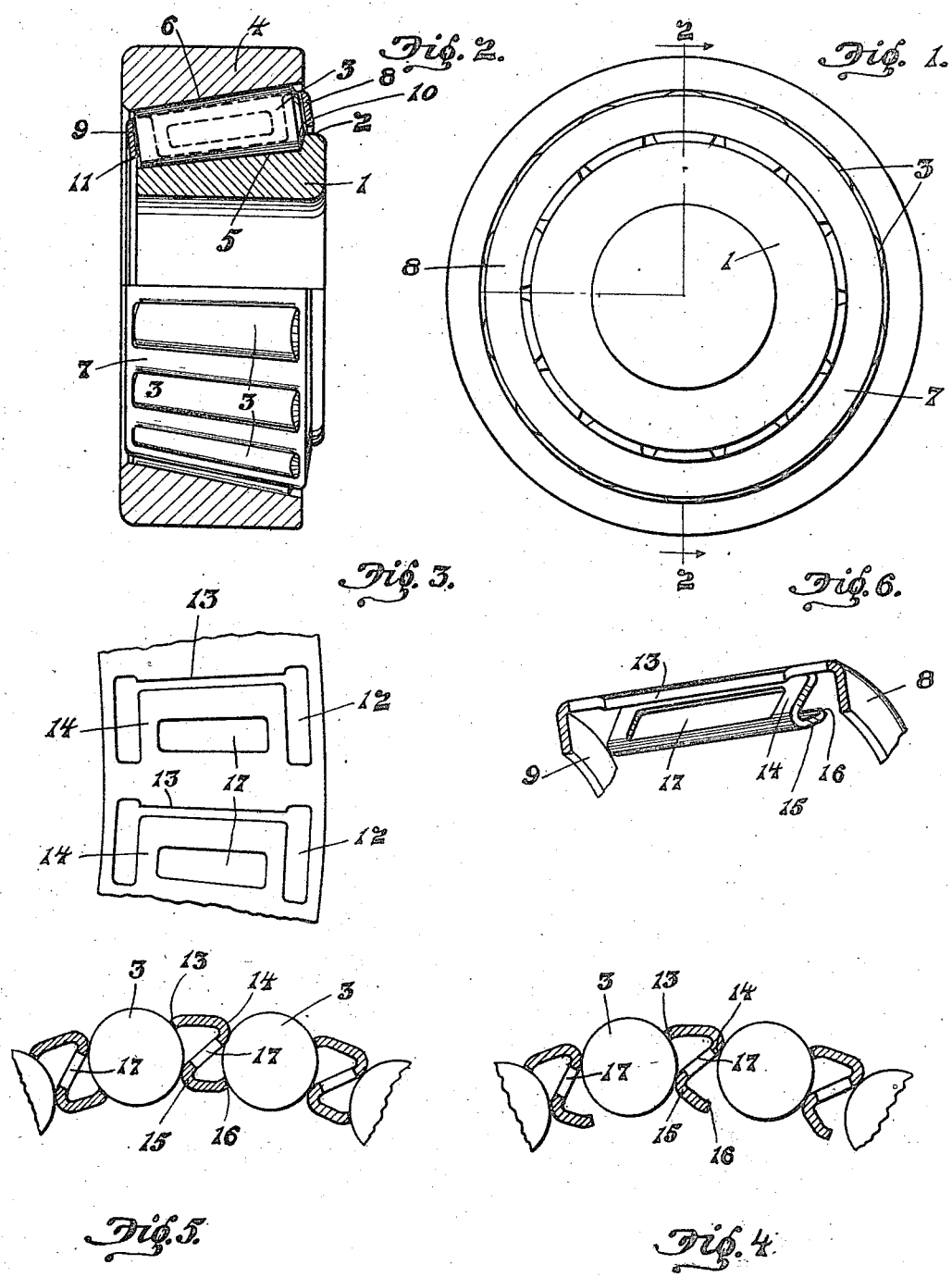

ARTHUR K. WHITMER, OF CANTON, OHIO, ASSIGNOR OF ONE-HALF TO WALTER W. HOENECKE, OF CANTON, OHIO.

ROLLER-BEARING.

1,150,565.  Specification of Letters Patent.  Patented Aug. 17, 1915.

Application filed September 12, 1914. Serial No. 861,380.

*To all whom it may concern:*

Be it known that I, ARTHUR K. WHITMER, a citizen of the United States, residing at Canton, in the county of Stark and State of Ohio, have invented a new and useful Roller-Bearing, of which the following is a specification.

This invention relates to roller bearings, and more especially to bearings comprising conical rollers arranged circularly and retained in position by means of a cage.

The object of this invention is to provide a sheet metal retaining cage, for the rollers, which will distribute the strain equally.

Another object is to construct the retaining cage so as to allow for proper lubrication of all of the rollers.

With these objects in view the invention consists in the novel construction and arrangement of parts, hereinafter described, illustrated in the accompanying drawings, and particularly pointed out in the appended claims, it being understood that various changes in form, proportions, size and minor details of construction may be made without departing from the spirit or sacrificing any of the advantages of the invention.

In the drawings Figure 1 is an end elevation of my roller bearing. Fig. 2 is a section on line 2—2, of Fig. 1. Fig. 3 is a fragmentary plan view of a portion of the blank from which the cage is formed before the roller spacing flanges have been bent into shape. Fig. 4 is a fragmentary sectional view showing the position of the roller spacing flanges at the time the rollers are inserted. Fig. 5 is a similar view showing the roller spacing flanges bent into position to retain the rollers. Fig. 6 is a fragmentary perspective view of the roller retaining cage.

Similar numerals of reference indicate corresponding parts throughout the several figures of the drawing.

Referring more specifically to the construction illustrated in the accompanying drawing, the numeral 1 indicates a conical bearing sleeve adapted to be mounted upon an axle or shaft. The sleeve is provided with an external annular flange 2 at the larger end thereof. A series of conical rollers 3 are held in spaced relationship between the sleeve 1 and the collar 4, the rollers 3 being tapered to conform to the tapered outer surface 5 of the sleeve 1 and the tapered inner surface 6 of the collar 4, a cage 7, preferably stamped from sheet metal, being interposed between the sleeve 1 and the collar 4 for the purpose of properly spacing the rollers 3.

The cage 7 is tapered to conform to the contour of the outer surface of the sleeve 1 and the inner surface of the collar 4 and is provided at its ends with the inwardly disposed annular flanges 8 and 9 between which flanges the rollers 3 are located, the flanges being located in a plane to conform with the ends 10 and 11 of the rollers. Suitable apertures 12 are formed at intervals around the periphery of the cage 7 for the purpose of accommodating the rollers, the said rollers being retained within the cage by means of a narrow flange 13 formed along one side of each of the apertures 12, said flange adapted to be bent downward the outer edge thereof being located in juxtaposition to the roller, and a relatively wide flange 14 which is formed along the opposite side of the aperture 12, said flange 14 adapted to be bent downward and backward into the position shown in Fig. 4 of the drawings, an auxiliary flange 15 being formed along the lower portion of the flange 14. When the flanges are in the position shown in Fig. 4 of the drawings the rollers 3 may be inserted in the cage within each of the apertures 12 after which the auxiliary flanges 15 are bent upward, their outer curved edges 16 being located in juxtaposition to the rollers thus holding the rollers in position in the cage. Each of the flanges 14 is provided with a longitudinal slot 17 through which lubricating oil or grease is adapted to circulate so that all parts of the bearing will be uniformly lubricated.

By first assembling the bearing rollers within the cage and then bending up the auxiliary flanges 15 so as to retain each of the rollers in its position in the cage it will be seen that all of the rollers are carried as a unit in the cage and may be so placed between the sleeve 1 and collar 4 or removed therefrom for the purpose of cleaning or replacing a roller. When it is necessary to replace one of the rollers the corresponding auxiliary flange 15 is bent down into the position shown in Fig. 4 and a new roller may be inserted in the flange bent back into proper position to retain the roller.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claims.

I claim:

1. An integral sheet metal retainer for bearing rollers comprising a conical shell having inwardly disposed annular flanges at its ends, a plurality of inwardly disposed lateral flanges spaced apart and forming bearing openings between adjacent flanges, bearing rollers located between said lateral flanges and auxiliary retaining flanges upon the lower extremities of said lateral flanges.

2. An integral sheet metal retainer for bearing rollers comprising a conical shell having inwardly disposed annular flanges at its end, a plurality of inwardly disposed lateral flanges spaced apart and forming bearing openings between adjacent flanges, bearing rollers between said lateral flanges, said lateral flanges provided with apertures adapted to allow the admission of lubricating fluid to the bearing rollers and auxiliary retaining flanges upon the lower extremities of said lateral flanges.

3. An integral sheet metal retainer for bearing rollers, comprising a conical shell having a series of bearing openings therein, inwardly disposed annular flanges at its ends, an inwardly disposed relatively wide lateral flange located at one side of each of said bearing openings, a relatively narrow inwardly disposed lateral flange located at the opposite side of each of said bearing openings, bearing rollers between said lateral flanges, auxiliary retaining flanges upon the lower extremities of said relatively wide lateral flanges and said relatively wide lateral flanges provided with apertures adapted to allow the admission of lubricating fluid to said bearing rollers.

In testimony that I claim the above, I have hereunto subscribed my name in the presence of two witnesses.

ARTHUR K. WHITMER.

Witnesses:
SYLVIA BORON,
ROBERT KARCHER.